May 20, 1924.
A. H. WADELL
1,494,969
MACHINE FOR BORING CYLINDRICAL BODIES
Filed Nov. 23, 1922    2 Sheets-Sheet 2
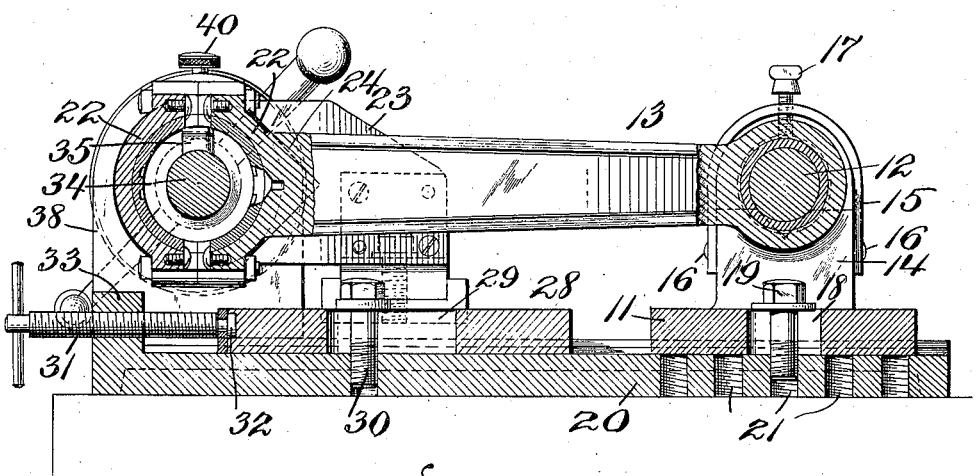
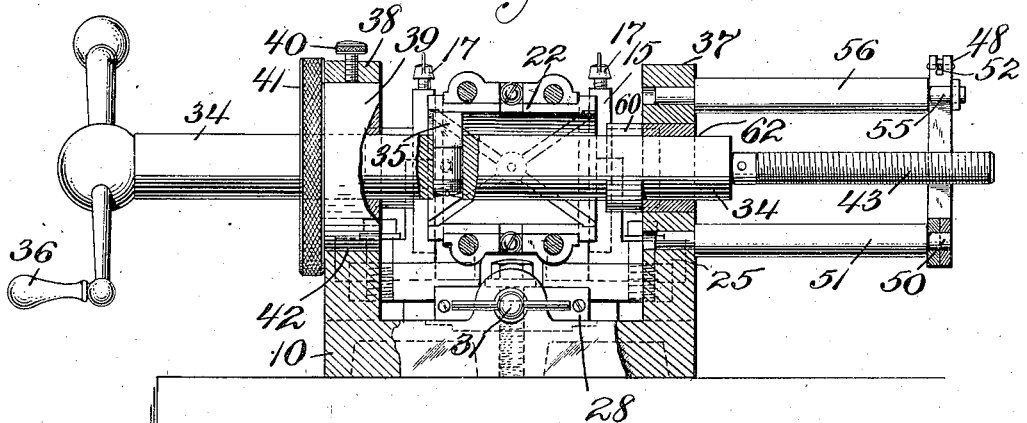
INVENTOR
Albert H. Wadell,
BY
Wm H. Campfield,
ATTORNEY Patented May 20, 1924.

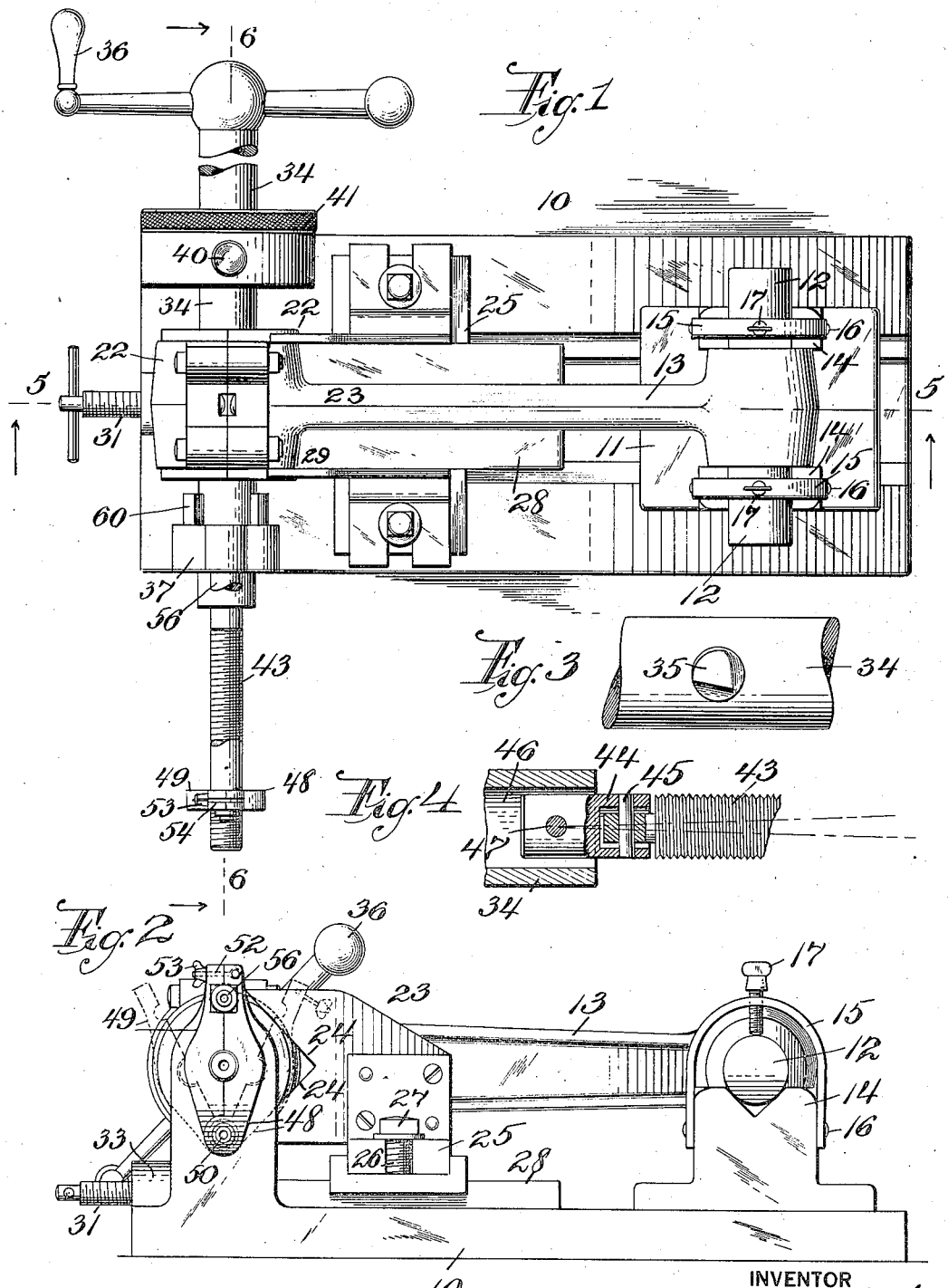

1,494,969

UNITED STATES PATENT OFFICE.

ALBERT H. WADELL, OF NEWARK, NEW JERSEY, ASSIGNOR OF ONE-HALF TO CARL E. ANDERSON, OF EAST ORANGE, NEW JERSEY.

MACHINE FOR BORING CYLINDRICAL BODIES.

Application filed November 23, 1922. Serial No. 602,693.

*To all whom it may concern:*

Be it known that I, ALBERT H. WADELL, a citizen of the United States, and a resident of Newark, county of Essex, and State of New Jersey, have invented certain new and useful Improvements in Machines for Boring Cylindrical Bodies, of which the following is a specification.

This invention relates to a machine for boring cylindrical bodies, and is particularly adapted for finishing the interior of bearings on connecting rods and similar elements by the rotation of a tool which is gradually passed longitudinally through the article being bored.

The invention is designed to provide a machine of this kind which can be manually operated, if desired, which is simple in its operation, which can be quickly adjusted, which will bore the bearing or other element quickly, and which can quickly adjust the article to be bored and the tool to be used in the boring, and one in which the tool and the shaft on which it is mounted can be disconnected from the propelling means and passed from or into the element to be bored longitudinally thereof.

The invention also consists in certain details of construction which will be hereinafter more fully described and finally embodied in the claims.

The invention is illustrated in the accompanying drawings, in which Figure 1 is a top view of a machine made according to my invention. Figure 2 is a side view of the machine shown in Figure 1. Figure 3 is an enlarged edge view of the cutter and a portion of the shaft in elevation. Figure 4 is a detail section of a connection between the main and the extension portions of the shaft. Figure 5 is a longitudinal section taken on line 5—5 in Figure 1. Figure 6 is a section taken on line 6—6 in Figure 1, and Figure 7 is a detail view showing how measurements for adjusting the tool can be made.

The machine comprises a suitable base on which the article is mounted. The article illustrated and described in this application, to make the operation of the machine clear, is the connecting rod of an automobile engine. The machine is designed to permit the installation of the cutter and its propelling and rotating mechanism while the connecting rod is in its clamped or secured position and to permit the removal of the cutter and its shaft longitudinally from the bearing of the connecting rod so that the connecting rod can be removed from its holding means.

A machine of this kind facilitates the work and is adapted for manual operation, therefore being well adapted for use in garages, where quick repairs are desirable, and in which a bearing can be finished so that it accurately fits a crank shaft or the like.

In the drawings the machine is shown as provided with a suitable base 10 which has on one end the sliding holder 11, which holder is adapted to receive the end of a connecting rod that is connected with the piston of an engine, and the wrist pin 12 is inserted in the connecting rod 13, the wrist pin being supported on the blocks 14, and when in position the yokes 15 are swung upward on their pivots 16 and the clamping screws 17 are used to hold the wrist pin against movement.

Adjustment of the holder is possible to take larger or smaller sizes of connecting rods, and for this adjustment I show in the drawings a slot 18 in the holder, through which the screw 19 is passed to secure the holder in any of its adjusted positions by screwing it down tightly against the holder, the base 20 of the machine 10 having screw-threaded holes 21 which provide a still further adjustment if it is necessary to move the screw 19.

The bearing 22 of the connecting rod is shown as being made of the usual form, with the two members clamped together to form a cylindrical body, and is maintained in its position by two cheek-pieces 23 which flank the connecting rod and have V-shaped openings 24 so that any diameter of bearing will fit in the cheek-pieces, these cheek-pieces being mounted on plates 25 which are in themselves adjustable transversely by the slots 26, through which the bolts 27 pass, these transversely adjustable plates being in turn mounted on a slide 28 which is slotted at 29 and has the screw 30 to hold it in adjusted positions, and it can be given a fine adjustment, before it is clamped in position, by means of the screw 31 which has a headed end 32 secured in the slide 28 and is operable through a screw-threaded boss 33 on the base of the machine.

The shaft 34 supports the tool 35 and is rotated by any suitable means, and I show the machine as adapted for manual manipulation by means of the handle 36. The shaft 34 is supported in standards 37 and 38, the shaft having a bearing collar 39 which is of large diameter relative to the shaft and which fits in a large opening 42 in the standard 38, and, when inserted, is held in position by suitable means, such as the set screw 40 and is quickly placed in position and fastened because its inward movement is limited by the flange 41. The opening 42, in the standard 38, for the collar 39 is made large so that the shaft with the collar 39 can be withdrawn, after the collar is released, through the opening 42 in the standard 38, thus permitting the insertion and removal of the shaft and its cutter through the element that is to be bored or that has been bored.

When the shaft, with its tool, is rotated, it is propelled by suitable means, and I show for this purpose an extension member 43 on the end of the shaft, this extension member being preferably secured so that it has a limited transverse movement, the connection being shown in detail in Figure 4, the extension fitting loosely into the sleeve 44 and being secured therein so that it has a limited rocking movement on the pin 45, the sleeve 44 in turn fitting loosely in the recess 46 in the main shaft member 34, being held therein by a pin 47 on which it rocks, the pins 45 and 47 thus allowing a slight movement transversely of the extension member, the purpose of which will be described hereinafter.

The nut for the screw is formed so that it can be readily detached from the screw to permit the longitudinal withdrawal or insertion of the shaft, and I show in the drawings two nut members 48 and 49 which are both pivoted, as at 50, on the end of a post 51, and when swung upward into position they envelop the screw-threaded part of the extension 43, each of the nut members being recessed to receive the screw-threaded member 43, these recessed parts being also screw-threaded, so that when the shaft is turned it is propelled forward. The nut members are locked together by suitable means, such as the pivot screw 52 which has a suitable nut 53 on it, the screw fitting down in a slot 54 in the nut member opposite the one to which it is pivotally secured. The nut members are also braced at the top by fitting into the recessed part 55 on the post 56.

The cutter 35 is adjustable, and the form of adjustment shown comprises a screw 57, against which the tool 35 is backed, the screw 57 and the tool 35 both being placed in the transverse opening 58 in the shaft, and, when adjusted, the tool is held against forward movement by the lock screw 59.

To permit an accurate measurement for adjusting the tool to the desired diameter of bore, I provide a measuring collar 60 which is in the form of a ring that closely fits the shaft 34, but is slidable thereon so that it can be placed opposite the tool to provide a bearing opposite the end of the tool on which suitable measuring elements, such as the ends 61 of a caliper or micrometer, can be placed to insure the proper diameter to be traversed by the end of the boring tool. This measurement is done before the shaft is inserted in the machine, the collar 60 remaining on the shaft after the shaft is inserted in the machine and lying idly against one of the standards, it being shown as resting against the standard 37.

In operating the machine, after the crank shaft or other element to be bored has been securely placed in position and the tool has been adjusted to its proper position, the shaft is inserted in the machine, passing first through the large opening 42 and then through the small opening 62 in the standard 37, the bearing collar 39 is slid inside of the opening 42 and is clamped down by the screw 40, the nut members 48 and 49 are swung upward and are locked together to form a nut for the extension 43, and then the handle is turned, which rotates the shaft and its cutter, and the extension 43, being screw-threaded, then acts to draw the shaft longitudinally so that the cutter passes in a helical path around the inside of the bushing or bearing that is to be finished and bores it for the required distance. The screw-threads on the shaft 43 are usually fine, that is, of slight pitch, so as to make work on the cutter at any one rotation easy, thus permitting its manual operation. The loose connection between the extension member 43 and the shaft 34 prevents stripping of the thread if, for any reason, the shaft 34 becomes slightly out of alignment or in case the post 51 or the post 56, through strain, become slightly out of alignment.

When the boring has been completed the nut members 48 and 49 are released from the extension 43, the screw 40 is loosened and the shaft and its cutter can be withdrawn longitudinally from the work, which is ready for use.

It will be understood that minor changes can be made in the arrangement and proportion of the parts without departing from the scope of the invention.

I claim:

1. A boring machine comprising a work support, a shaft with a cutter thereon, a pair of standards to receive said shaft, one standard having an opening to permit passage of the shaft and the cutter therein, a bearing collar on the shaft to fit the opening in the standard, a threaded extension on the shaft, a flexible connection between the shaft and the extension and a nut for engaging the extension, said nut being detachable laterally from said extension.

2. A boring machine comprising a work support, a shaft with a cutter thereon, a pair of standards to receive said shaft, one standard having an opening to permit passage of the shaft and the cutter therein, a bearing collar on the shaft to fit the opening in the standard, a threaded extension on the shaft, a flexible connection between the shaft and the extension, and nut members pivoted so that they can be swung to embrace the extension or to release it.

In testimony that I claim the foregoing, I have hereto set my hand, this 17th day of November, 1922.

ALBERT H. WADELL.